April 8, 1952 K. ROHRER 2,592,187
AUTOMATIC GUIDE PIN FOR ROUTING MACHINES
Filed Oct. 9, 1948 2 SHEETS—SHEET 1
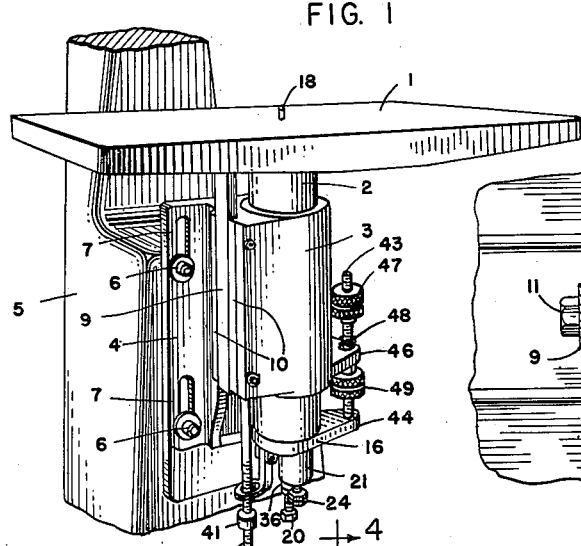
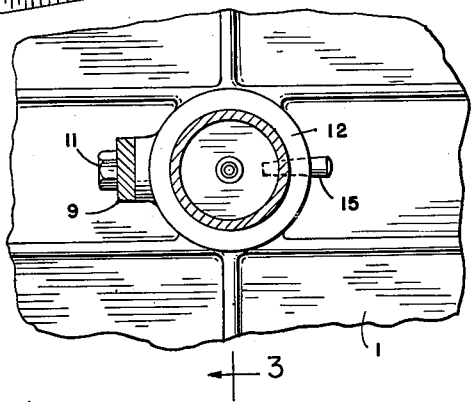
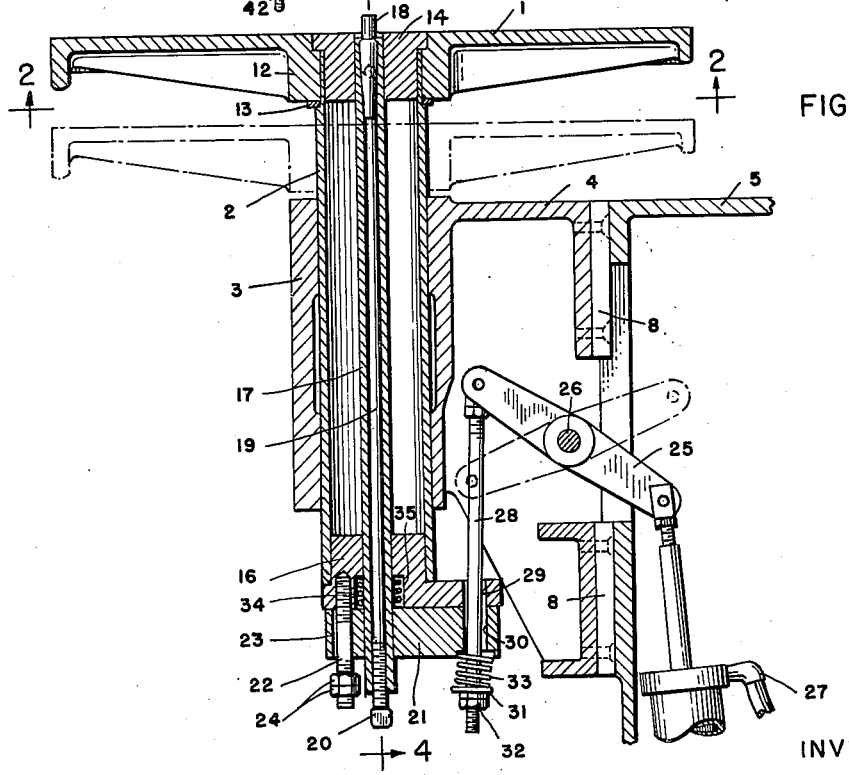
INVENTOR:
KARL ROHRER
BY
ATT'YS April 8, 1952  K. ROHRER  2,592,187
AUTOMATIC GUIDE PIN FOR ROUTING MACHINES
Filed Oct. 9, 1948  2 SHEETS—SHEET 2

INVENTOR:
KARL ROHRER
BY
ATT'YS

Patented Apr. 8, 1952

2,592,187

UNITED STATES PATENT OFFICE 2,592,187

AUTOMATIC GUIDE PIN FOR ROUTING MACHINES

Karl Rohrer, Chicago, Ill., assignor to Onsrud Machine Works Inc., Chicago, Ill., a corporation of Illinois Application October 9, 1948, Serial No. 53,675

3 Claims. (Cl. 144—137)

This invention relates to improvements in routing machines, and particularly to improvements in pattern guide pins for the work tables of such devices.

The main objects of this invention are to provide an improved automatic guide pin for the work table of a routing machine; to provide an improved disappearing guide pin for such devices which will leave the work table clear for placing and removing the pattern and work between routing operations; to provide an improved guide pin which will project above the work table surface only during the working operation; to provide an improved guide pin which will be projected above the table surface as the table is moved to raise the work into operating position and which will be automatically retained in the projected position until the work table has been completely lowered to disengage the work from the cutter; and to provide an improved guide pin arrangement whereby the timing and operation of the guide pin is wholly automatic.

A specific embodiment of this invention is shown in the accompanying drawings in which:

Figure 1 is a perspective view showing the work table of a vertical spindle router embodying the improved guide pin mechanism, the base or frame of the router being partially broken away.

Fig. 2 is a fragmentary plan view of the bottom side of the work table showing the collar by which the work table is mounted on its elevating cylinder or support and to which the table aligning gib is attached. The view is taken on line 2—2 of Fig. 3.

Fig. 3 is a sectional side elevation of the device, as on line 3—3 of Fig. 2, showing the work table and guide pin mechanism in raised or operating position, the normal or lowered position of the work table being shown in dotted outline.

Figure 4:
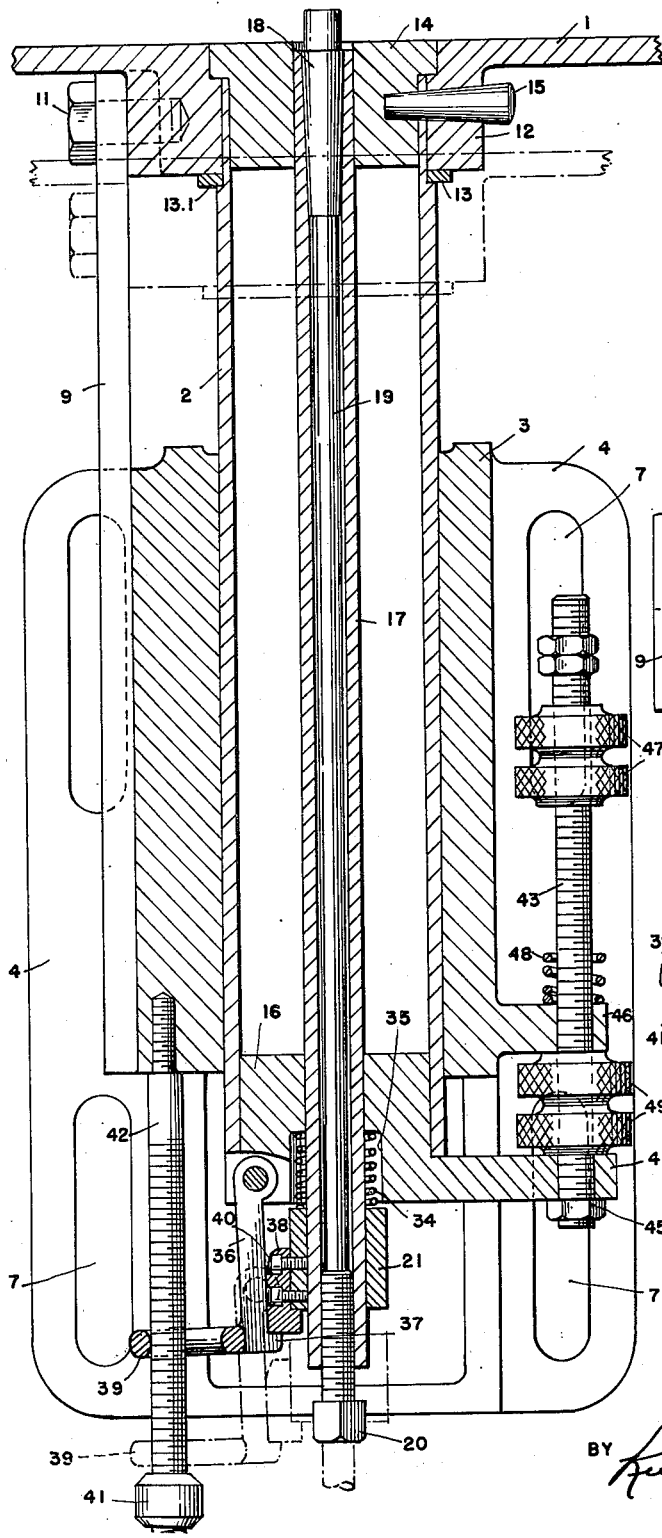
Fig. 4 is a sectional elevation of the same as taken on line 4—4 of Fig. 3, the parts again being shown in elevated position and the dotted outline showing the shifting parts as they approach the latch tripping position.

In the form shown in the drawings, the improved guide pin mechanism is embodied in the work table assembly of a vertical spindle router, the work table being of the type that is raised and lowered to bring the work into engagement with a router which is disposed directly above and axially aligned with the guide pin located at the center of the work table. The vertical spindle router itself is not shown since such devices are well-known in the art and only that portion of the main router base or frame, on which the supporting knee for the work table is attached, is illustrated.

As shown, the work table 1 is a flat surfaced horizontally disposed casting mounted on the upper end of a cylindrical supporting column 2, which in turn extends vertically through a sleeve 3 integrally formed with a knee bracket 4 suitably mounted on the router frame 5. In Fig. 1, the knee bracket is shown mounted on the router frame casting 5 by means of bolts 6 which pass through vertical slots 7 in lateral flanges formed on the knee bracket so that the knee may be adjustable on the frame 5 in the vertical direction. Preferably the knee bracket 4 is keyed to the frame casting 5 in order to maintain accuracy of alignment with the router spindle, the keys being vertically disposed, as shown at 8 in Fig. 3, and arranged to slide in vertical keyways formed in the front face of the frame 5.

The cylinder or column 2, which supports the work table 1, is preferably a hollow tube, precision ground on its outer surface, which slides vertically in the sleeve 3 which is in turn precision honed for an accurate fit with the cylinder 2. Also, a gib 9, extending downwardly from the table 1, is provided to prevent rotation of the table and its supporting cylinder 2. The gib 9 extends between adjustable gib ways 10, disposed vertically at one side of the sleeve 3, and is secured by a bolt 11, at its upper end, on a hub 12 formed integrally with the table 1.

The table 1 is mounted on the upper end of the cylinder or column 2 by means of the hub 12, which is centrally formed on the under side of the table and has a bore of somewhat less diameter then the outside diameter of the sliding portion of the cylinder 2. The upper end of the cylinder 2 is of reduced diameter to fit the bore of the hub 12, and the lower end of the hub rests on a washer 13, which in turn is seated on the shoulder 13.1 formed by the reduced diameter of the cylinder. The table 1 is secured on the support column or cylinder by means of a plug 14 which fits into the upper end of the cylinder from the top of the table, and is secured by means of a tapered pin 15 which is inserted into a suitable bore extending through the hub 12 and into the plug 14 in a direction normal to the axis of the cylinder. As shown, the hub opening on the upper side of the table 1 is counterbored and the plug 14 is provided with a flange arranged to fit the counterbore, the upper end of the plug 14 being formed to be flush with the surface of the table 1.

The lower or bottom end of the column 2 is provided with a cap or end member 16 having a solid cylindrical portion with fits into the cylinder bore where it is suitably secured to the cylinder so as to become a substantially integral part therewith, and the cap or end member 16 serves as an operating member by means of which the cylinder is raised or lowered in the sleeve 3 to raise or lower the work table 1.

In the form shown, particularly in Figs. 3 and 4, the automatic guide pin, with which the present invention is concerned, comprises a carrier or tube 17 disposed centrally within the hollow cylinder 2 and arranged to slide vertically through suitable bores in the plug 14 and bottom cap member 16, and a tapered pin 18 which fits into the upper end of the carrier tube 17 and projects outwardly therefrom. A spacer rod 19 is disposed within the tube 17 and serves as an adjustable support for the guide pin 18 whereby position of the pin in the tube and the extent of projection of the pin beyond the upper end of the tube 17 may be adjusted, the adjustment being obtained by means of a screw 20 which is threaded into the bottom end of the tube and supports the lower end of the spacer rod 19.

The lower end of the carrier tube 17 is mounted fast in an operating member or yoke 21, which is disposed below the cap or end member 16 of the table supporting column 2, and is arranged to extend through the yoke for access to the adjusting screw 20. The yoke 21 is, in turn, slidably mounted on a vertical yoke guide bolt 22, which is threaded into the bottom side of the cap member 16 and extends downwardly therefrom through a suitable bore 23 in the yoke. The bolt 22 is considerably longer than the thickness of the yoke 21 so that relative axial movement between the yoke 21 and the cylinder cap member 16 may be had, and a pair of jam nuts 24 are provided on the lower end of the bolt 22 to limit the extent of the relative movement of the yoke. Thus, since the carrier 17 is secured fast in the yoke 21, up and down movement of the yoke 21 relative to the base member 16 will cause the carrier to be reciprocated whereby guide pin 18 may be projected and retracted with respect to the upper surface of the work table 1.

As shown in Fig. 3, the support column 2 and the table 1 are raised and lowered by means of an operating means comprising a lever 25, centrally fulcrumed on a suitable shaft 26 mounted horizontally in the knee 4, one end of the lever 25 extending outwardly toward the sleeve 3 and the other end extending through a suitable opening into the interior of the support column 5 where it is connected to a suitable power means such as an air cylinder 27. The outer end of the lever 25 is pivotally attached to a connecting rod 28, which extends downwardly from the lever and through vertical openings 29 and 30 in aligned rearwardly projecting portions of the cap or end member 16 and the yoke 21 respectively, and the lower end of the connecting rod 28 is provided with a washer 31 supported on suitable jam nuts 32 and arranged to bear on a coil spring 33 disposed around the connecting rod between the washer and the bottom surface yoke. Normally, when the table 1 is in its lowered position, the lever is in the position shown in dotted outline in Fig. 3, and the connecting rod hangs loosely in the openings 29 and 30 disengaged from the yoke 21, and the yoke hangs on the guide bolt 22, supported by the jam nuts 24.

Thus, actuation of the air cylinder 27, to pull downwardly on the inner end of the lever 25, shifts the lever to the position shown in solid outline in Fig. 3, causing the connecting rod 28 to rise and lift the yoke 21 until it engages the cylinder cap or end member 16, whereupon further movement of the lever 25 causes the support column 2 to shift upwardly in the sleeve 3 and raise the elevation of the work table 1. Since the elevating movement produced by the lever 25 and the connecting rod 28 is first applied to the yoke 21, the carrier tube 17 will be shifted upwardly to project the guide pin 18 above the surface of the work table 1 before the yoke 21 engages the cap member 16. In this manner the guide pin 18 is caused to engage with the pattern, not shown, before the work table is elevated to operating position.

The distance through which the yoke 21 is moved before it engages the cylinder cap member 16 is determined by the location of the jam nuts 24 on the guide bolt 22, and this distance is determined by the desired extent of movement of the guide pin between its fully projected position and its normal retracted position below the surface of the table 1.

Preferably a coiled spring 34 is disposed between the yoke 21 and the cylinder end member 16 in order to cushion the engagement between the two members upon actuation of the lever 25, and as shown, the cushioning spring 34 is seated in a recess 35 in the bottom side of the cylinder support member 16 so that the spring will not interfere with flat abutting engagement between the yoke 21 and the end member 16.

In order that the guide pin assembly may be retained in elevated position until the table 1 and the support column 2 have been completely lowered to the normal loading and unloading position, an automatic latch means is provided for the guide pin assembly and this latch means comprises a downwardly hanging lever 36, pivotedly mounted at the bottom side of the cylinder support member 16 at one side thereof, having a hook portion 37 arranged to engage beneath the bottom surface of a latch plate 38 suitably mounted on the side of the yoke member 21. The lever 36 is also provided with a laterally projecting ring 39, which extends in the opposite direction from the hook portion 37 and which weights the lever 36 so as to normally urge the same to swing by gravity toward the latch plate 38.

Normally, when the guide pin assembly is in retracted position, the latch plate 38 is disposed below the lever 36 and the upper margin of the latch plate is beveled as at 40 so that, when the guide pin assembly is elevated, the hook portion 37 of the lever 36 will be cammed outwardly to allow the latch plate to pass until the guide pin assembly is in raised position at which point the hook portion engages beneath the latch plate. The length of the lever 36 is such that, when the latch pin assembly has been raised and the yoke 21 is substantially in engagement with the cylinder end member 16, the hook portion 37 will engage beneath the latch plate 38 and lock the same in its raised position.

Figure 5:
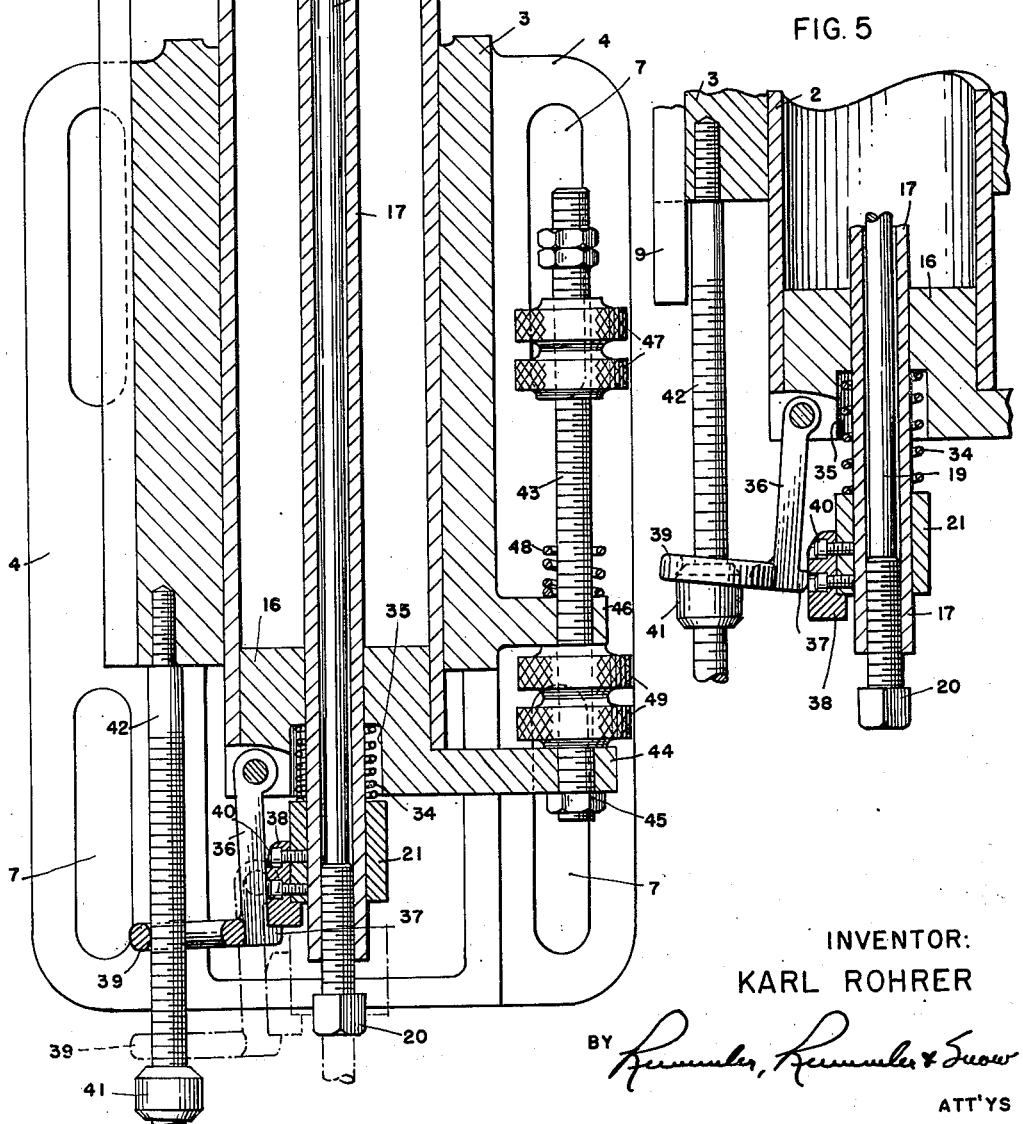
Fig. 5 is a fragmentary sectional detail of the work table support showing the guide pin latching mechanism in disengaged or unlatched position.

The guide pin latching mechanism is tripped or released automatically, when the work table has been returned to its lowermost position, by means of a cam nut 41 mounted on a fixed rod 42 extending downwardly from the body of the sleeve 4 through the ring 39 so that when the cylinder or column 2 reaches its lowermost position, the cam nut 41 will engage the ring 39 and cause the latch lever to be swung outwardly to release the catch portion 37 from the hook plate 38. In order to facilitate the camming action between the nut 41 and the ring 39, the upper surface of the nut 41 is beveled and the ring 39 is formed with a rounded inner surface so that engagement of the nut with the ring will lift or cam the ring outwardly so as to pull the lever 36 away from the latch plate 38, as shown in Fig. 5. The cam nut 41 is threaded on the rod 42 so that it may be adjusted vertically to cause the guide pin mechanism to be released from the latch at the desired point in the downward travel of the work table.

The extent of elevation of the work table between the loading position and the operating position is adjustable and means to limit such movement of the table 1 is provided by a stop rod 43, which has its lower end threaded through a laterally projecting portion 44 of the cylinder end member 16 and locked thereto by means of a nut 45. The stop rod 43 extends upwardly through an opening in a laterally projecting lug or ear 46 on the knee bracket sleeve 3 and is provided on its upper portion with a pair of knurled jam nuts 47. Thus, since the stop rod 43 moves up and down with the column 2 and relative to the sleeve 3, the downward movement of the table will be limited by engagement of the jam nuts 47 with the lug or ear 46 on the sleeve 3 and, by adjustment of the jam nuts 47 up or down along the stop rod 43, the lowermost portion of the work table can be set as desired.

Preferably a coiled cushion spring 48 is disposed around the stop rod 43 and rests upon the upper side of the ear or lug 46, to relieve some of the shock load that might be applied to sleeve 3 as the table and its supporting column are dropped to the lowermost or loading position. Also, a pair of adjustable jam nuts 49 are provided on the stop rod 43, below the projecting lug 46, to serve as limit means for the upward movement of the work table and to determine the depth of entry of the router bit into the work.

It will now be seen that the automatic guide pin 18 will normally be disposed below the working surface of the work table 1, but that upon actuation of the elevating mechanism to raise the work table into operative position toward the cutter or router, which is not shown, the automatic guide pin assembly will be engaged by the elevating mechanism in advance of the table support column and lifted to project the guide pin above the surface of the work table 1 prior to any elevating action being transmitted to the work table supporting column itself. Thus the pattern, which has been placed upon the work table before the elevating operation is begun, will be engaged by the guide pin from the moment that the work table begins to rise and the pattern will be firmly keyed to the guide pin so that the operator need only slide the pattern over the surface of the table to cause the router bit or cutter to follow the desired path through the work.

When the router operation has been completed, the elevating mechanism is released, or de-energized, so as to allow the work table to shift downwardly by gravity to its normal position. The automatic guide pin, however, is held in its raised or elevated position by the latch mechanism until the table reaches substantially its normal or lowermost position. Thus, the pattern is kept keyed to the work table surface while the router bit or cutter is being withdrawn from the work and as the work table reaches its lower or loading position, the guide pin latch, through engagement with the cam nut 41, is released and the guide pin is dropped to its retracted position whereupon the pattern can be easily removed by merely sliding it off from the forward edge of work table 1.

The main advantages of this invention reside in the fact that the improved guide pin automatically disappears at the loading position so that a perfectly level and flat work table is had during the loading operation, and the operator is relieved of the necessity of lifting the pattern and the work over the guide pin while the pattern is being placed on the table. Further advantages reside in the fact that the guide pin is automatically extended into engagement with the pattern before the work table begins its upward movement, to cause the router bit or cutter to engage the work, thereby firmly keying the pattern to the table so that inaccuracies with respect to the cutting or routing operation are obviated.

Other advantages are to be found in that the guide pin is retained in its elevated, pattern keying, position until the router bit has been completely disengaged from the work and the work table has become lowered to its loading position, at which time the guide pin is released and lowered and the operator can remove the pattern and work by simply sliding it off from the work table; and still further advantages are derived from the fact that the disappearing guide pin minimizes operator fatigue and loss of time that would be otherwise occasioned were it necessary for the operator to lift the pattern over the guide pin either during the loading or unloading operations.

Although but one specific embodiment of this invention is herein shown and described, it will be understood that details of the construction shown may be altered or omitted without departing from the spirit of this invention as defined by the following claims.

I claim:

1. An automatic guide means for a router having a work table mounted on a vertically shiftable support column and including operating means for raising and lowering said column, said work table being provided with a vertical opening therethrough, said guide means comprising a carrier mounted in the table opening and vertically reciprocable therein, a guide pin mounted at the upper end of said carrier for reciprocation therewith, said carrier and guide pin being normally disposed below the table work surface, an operating member mounted on said carrier and shiftable vertically independently of the table support column, and means on said operating member engageable by the support column operating means as the latter is first actuated to raise the support column whereby the operating member will be shifted to raise said carrier upwardly in advance of the support column.

2. An automatic guide means for a router having a work table mounted on a vertically shiftable support column and including operating means for raising and lowering said column, said work table being provided with a vertical opening therethrough, said guide means comprising a carrier extending into the table opening and vertically reciprocable therein, a guide pin mounted at the upper end of said carrier for reciprocation therewith, said carrier and guide pin being normally disposed below the table work surface, an operating member mounted on said carrier and shiftable vertically independently of the table support column, means on said operating member engagable by the support column operating means as the latter is first actuated to raise the support column whereby the operating member will shift said carrier upwardly in advance of the support column, a base means having a fixed sleeve for slidably mounting said support column, a latch means pivotally mounted on said support column for engaging and locking said carrier in upwardly shifted position, and fixed release means mounted on said sleeve adjacent said support column for releasing engagement with said latch when said support column is returned to substantially its lowered position.

3. A pattern guide means for use in routers having a horizontal work table mounted on a hollow vertically slidable column and having operating means for raising and lowering said column through engagement with the lower end thereof, said table having a vertical opening therethrough aligned with said column, said guide means comprising a tubular member mounted in said column in alignment with the opening in said work table and shiftable vertically therein, a yoke secured on the lower end of said tubular member and disposed below the lower end of said column so as to be engaged and lifted by the column raising means in advance of elevation of said column, a slidable support rod disposed within said tubular member, a guide pin disposed in the upper end of said tubular member and resting on the end of said support rod, said guide pin projecting upwardly from said tubular member and being normally held thereby below the surface of said table, and means adjustably mounted on said tubular member and engaging said support rod for shifting said support rod axially relative to said tubular member to vary the extent of projection of said guide pin beyond the end of said tubular member, said tubular member being shifted by said column raising means to project said guide pin above the surface of said table upon elevation of said column.

KARL ROHRER.

REFERENCES CITED

The following references are of record in the file of this patent:

UNITED STATES PATENTS

| Number | Name | Date |
|---|---|---|
| 147,066 | Parry | Feb. 3, 1874 |
| 1,685,613 | Onsrud | Sept. 25, 1928 |
| 2,080,859 | Drapak et al. | May 18, 1937 |
| 2,204,871 | Strano et al. | June 18, 1940 |
| 2,252,112 | Bailey | Aug. 12, 1941 |

FOREIGN PATENTS

| Number | Country | Date |
|---|---|---|
| 619,366 | Great Britain | Mar. 8, 1949 |